United States Patent
Im

(10) Patent No.: US 9,031,728 B2
(45) Date of Patent: May 12, 2015

(54) ELECTRIC DRIVING TYPE UTILITY VEHICLE HAVING REGENERATIVE BRAKE FORCE DISTRIBUTION CONTROL FUNCTION, AND REGENERATIVE BRAKE FORCE DISTRIBUTION CONTROL METHOD THEREOF

(71) Applicant: Daedong Industrial Co., Ltd., Daegu (KR)

(72) Inventor: Sung Do Im, Changnyeong-gun (KR)

(73) Assignee: Daedong Industrial Co., Ltd., Daegu (KR)

(*) Notice: Subject to any disclaimer, the term of this patent is extended or adjusted under 35 U.S.C. 154(b) by 0 days.

(21) Appl. No.: 14/238,950

(22) PCT Filed: Dec. 21, 2012

(86) PCT No.: PCT/KR2012/011280
§ 371 (c)(1),
(2) Date: Feb. 14, 2014

(87) PCT Pub. No.: WO2013/095050
PCT Pub. Date: Jun. 27, 2013

(65) Prior Publication Data
US 2014/0297082 A1 Oct. 2, 2014

(30) Foreign Application Priority Data
Dec. 23, 2011 (KR) .................. 10-2011-0141086

(51) Int. Cl.
*B60L 7/10* (2006.01)
*B60L 15/20* (2006.01)
(Continued)

(52) U.S. Cl.
CPC .............. *B60L 15/20* (2013.01); *B60L 15/2009* (2013.01); *B60L 15/2018* (2013.01); *B60L 3/08* (2013.01);
(Continued)

(58) Field of Classification Search
CPC .................................. B60L 7/10; B60L 15/20
USPC ........ 701/22, 48, 50, 69, 81, 88, 89; 303/146, 303/152; 180/165
See application file for complete search history.

(56) References Cited

U.S. PATENT DOCUMENTS 5,796,175 A * 8/1998 Itoh et al. .................... 307/10.1
6,488,344 B2 * 12/2002 Huls et al. ..................... 303/152
(Continued)

FOREIGN PATENT DOCUMENTS

EP 0806316 B1 2/2004
JP 2001-260684 A 9/2001
(Continued)

OTHER PUBLICATIONS

Search report for International Application No. PCT/KR2012/011280.
(Continued)

*Primary Examiner* — Thomas Tarcza
*Assistant Examiner* — Tyler J Lee
(74) *Attorney, Agent, or Firm* — LRK Patent Law Firm

(57) ABSTRACT

An electric driving type utility vehicle having a regenerative brake force distribution control function, and a regenerative brake force distribution control method thereof are provided. The utility vehicle includes: a controller for controlling an output and a recovery of a motor; recovery sensing means for sensing a recovery braking state when the motor is driven; a power measurement unit for measuring the amount of recovery power generated in the recovery braking state; and a power switching unit for automatically switching a drive mode from a two-wheel drive mode to a four-wheel drive mode or vice versa according to the load condition. The present invention can switch the present mode to the four-wheel drive mode by operating the power switching unit according to the control of the controller when sensing the recovery brake through the recovery sensing means in the driving state.

5 Claims, 5 Drawing Sheets

(51) Int. Cl.
    *B60T 8/00*           (2006.01)
    *B60T 1/10*           (2006.01)
    *B60T 13/58*         (2006.01)
    *F16D 61/00*        (2006.01)
    *B60L 3/08*           (2006.01)

(52) U.S. Cl.
    CPC .......... *B60L 2260/26* (2013.01); *B60L 2260/28* (2013.01); *B60L 7/10* (2013.01); *B60L 8/00* (2013.01); *B60L 2200/00* (2013.01); *B60T 2270/604* (2013.01); *B60T 1/10* (2013.01); *B60T 13/586* (2013.01); *F16D 61/00* (2013.01); *Y02T 10/7258* (2013.01)

(56) References Cited

U.S. PATENT DOCUMENTS

| | | | |
|---|---|---|---|
| 6,930,405 B2* | 8/2005 | Gunji | 290/40 C |
| 7,455,135 B2* | 11/2008 | Janson et al. | 180/65.31 |
| 7,870,925 B2* | 1/2011 | Perakes et al. | 180/243 |
| 7,877,184 B2* | 1/2011 | Watanabe et al. | 701/54 |
| 8,366,210 B2* | 2/2013 | Maki et al. | 303/151 |
| 8,700,241 B2* | 4/2014 | Yoshimura | 701/22 |
| 2006/0151220 A1* | 7/2006 | Taniguchi et al. | 180/65.5 |

FOREIGN PATENT DOCUMENTS

| | | |
|---|---|---|
| JP | 2004-135471 A | 4/2004 |
| JP | 2005-059851 A | 3/2005 |
| JP | 2010-531260 A | 9/2010 |
| KR | 10-0229340 B1 | 11/1999 |
| KR | 10-2005-0048040 A | 5/2005 |

OTHER PUBLICATIONS

KIPO Notice of Allowance for Korean Patent Application No. 10-2011-0141086.

\* cited by examiner

ELECTRIC DRIVING TYPE UTILITY VEHICLE HAVING REGENERATIVE BRAKE FORCE DISTRIBUTION CONTROL FUNCTION, AND REGENERATIVE BRAKE FORCE DISTRIBUTION CONTROL METHOD THEREOF

TECHNICAL FIELD

The present invention relates to an electrically driven utility vehicle, and, particularly, to an electrically driven utility vehicle having a regenerative braking force distribution control function and a method of distributing and controlling regenerative braking force, wherein regenerative braking force when regenerative braking is generated while driving is uniformly distributed and transferred to all wheels.

BACKGROUND ART

Recently, a utility vehicle (UTV) is widely used in wide fields, such as distribution, construction, leisure, and agricultural use. In particular, a utility vehicle has a structure advantageous for steep path driving, and thus the utility vehicle is chiefly used as delivery means for carrying soil or the crops in construction sites or agricultural site or for carrying tools necessary for various tasks.

An electrically-driven type utility vehicle which can implement an eco-friendly vehicle because it never generates exhaust gas and has very low noise, unlike in the prior art in which a mechanical engine is mounted, is recently searched and developed. The electrically-driven type basically includes a motor for generating driving power, a battery that is an energy source, various control parts for controlling the motor and the battery, and other peripheral parts.

Driving speed of such an electric vehicle is changed by control of the output of the motor that is varied in proportion to the manipulation displacement of an acceleration pedal, and a motor is passively rotated by kinetic energy of the vehicle that is being driven when a foot is taken off from the acceleration pedal for braking while driving. Here, counter electromotive force generated when the motor is rotated by the kinetic energy of the vehicle and stored as available energy is called regeneration, and resistance generated in such a case and used as braking force is called regenerative brake.

If resistance generated in a regeneration process as described above is used as braking force, a braking force deviation is inevitably generated between driving wheels (front wheels in the case of front wheels driving vehicle and rear wheels in the case of rear wheels driving vehicle) and follower wheels in a vehicle braking process. That is, when braking the vehicle, mechanical braking force and regeneration braking force are simultaneously applied to the driving wheels directly connected to the motor, whereas only mechanical braking force is applied to the follower wheels.

When such a braking force deviation is generated in the wheel, overall braking stability and riding comfort, such as that rattling is generated in the vehicle during braking or eccentric braking in which the vehicle leans to one side, are reduced. In order to overcome such a braking force deviation, different control systems are constructed in the driving wheels and the follower wheels in order to compensate for a difference in the braking force. If the control systems are applied, however, there are problems in that a braking device construction becomes too complicated and costs are increased.

DISCLOSURE

Technical Problem

An object of the present invention is to provide an electrically driven utility vehicle having a regenerative braking force distribution control function and a method of distributing and controlling regenerative braking force of the electrically driven utility vehicle, which are capable of overcoming a braking force difference between driving wheels and follower wheels when regenerative braking is performed even without using a complicated control system for compensating for braking force.

Technical Solution

As a technical solution for achieving the object, the present invention provides an electrically driven utility vehicle having a regenerative braking force distribution control function, wherein the electrically driven utility vehicle is a utility vehicle that moves by driving a motor using electric energy as a power source, and the electrically driven utility vehicle includes a controller for controlling an output of the motor and regeneration, regenerative detection means for detecting a regenerative braking state while driving the motor, a power measurement unit for measuring the amount of regenerative power generated in the regenerative braking state, and a power switching unit for automatically changing a drive mode from a two-wheel to a four-wheel or from the four-wheel to the two-wheel according to a road surface condition, wherein the regenerative braking state is detected through the regenerative detection means while driving, and if a current drive mode is the two-wheel drive mode, the power switching unit operates by the controller and switches to the four-wheel drive mode.

In the present embodiment, the regenerative detection means may be a counter electromotive force relay driven by counter electromotive force (induced electromotive force) of the motor that is generated when the regenerative braking is generated.

Furthermore, the power switching unit may include an input shaft coupled to an output shaft of the motor in such a way as to be driven, a rear wheel drive shaft coupled to the input shaft in such a way as to be driven, a middle shaft coupled to the rear wheel drive shaft in such a way as to be driven and always rotated, a switching clutch provided over the middle shaft, a front wheel drive shaft coupled to the middle shaft in such a way as to selectively connect power by a medium of the switching clutch, and a casing providing a closed space by which each of the parts can be protected.

Here, the switching clutch may be a sync-mesh type transmission structure which can be manually manipulated through a lever and can automatically connect or block power by a switching motor according to control of the controller.

As another means for achieving the object, the present invention provides a regenerative braking force distribution and control method of an electrically driven utility vehicle, including steps of (a) determining a current drive mode while driving; (b) detecting regenerative braking while driving; and (c) switching the vehicle from the current drive mode to a four-wheel drive mode through control of a power switching unit through a controller if the regenerative braking is detected while driving and the current drive mode is a two-wheel drive mode.

Here, in the step of detecting the regenerative brake, the regenerative braking may be detected using counter electromotive force (induced electromotive force) of a motor generated when the regenerative braking is performed.

Advantageous Effects

In accordance with an embodiment of the present invention, when regenerative braking is generated while driving, regenerative braking force can be uniformly distributed and transferred to the front wheels and the rear wheels in response to switching to a four-wheel drive mode. Accordingly, a vehicle capable of overcoming a braking force difference between the driving wheels and the follower wheels when regenerative braking is performed even without using a complicated control system for compensating for braking force can be implemented, and there is an advantage in that a production cost can be lowered owing to the exclusion of a complicated control system from an economic viewpoint.

MODE FOR INVENTION

A preferred embodiment of the present invention is described in detail below with reference to the accompanying drawings. In describing the present invention, a detailed description of known constructions is omitted, and a detailed description of constructions that will make the gist of the present invention unnecessarily vague is also omitted.

Figure 1:
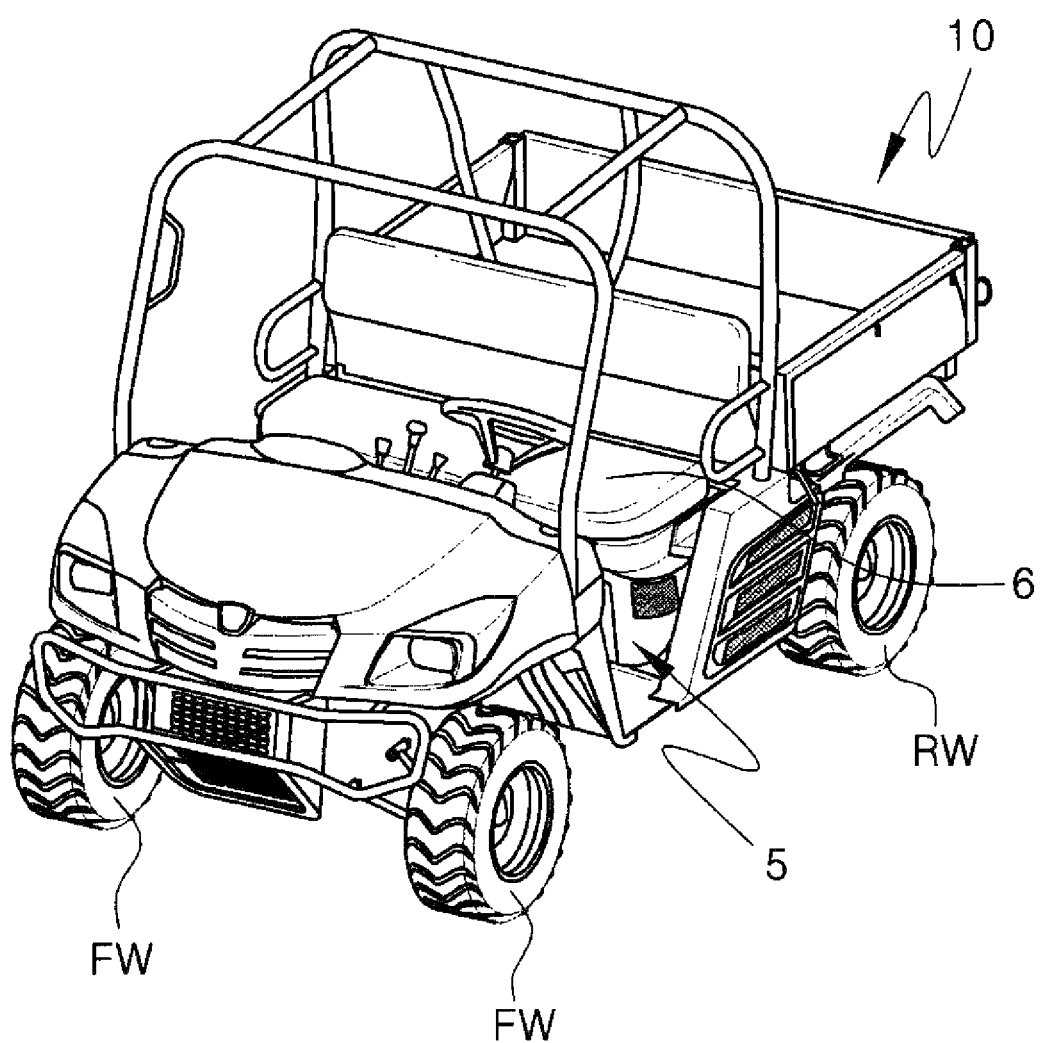
FIG. 1 is a perspective view of an electrically driven utility vehicle having a regenerative braking force distribution control function in accordance with an embodiment of the present invention.
Figure 2:
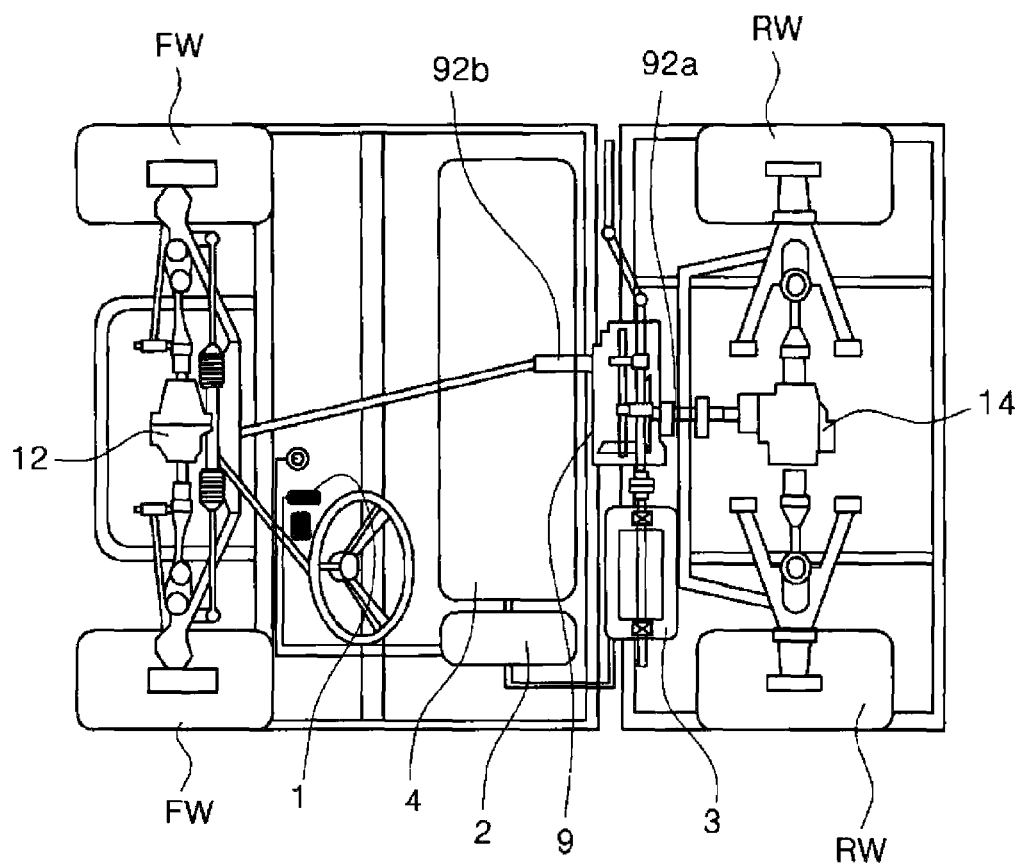
FIG. 2 is a schematic plan view schematically showing the general construction of the utility vehicle shown in FIG. 1.
Figure 3:
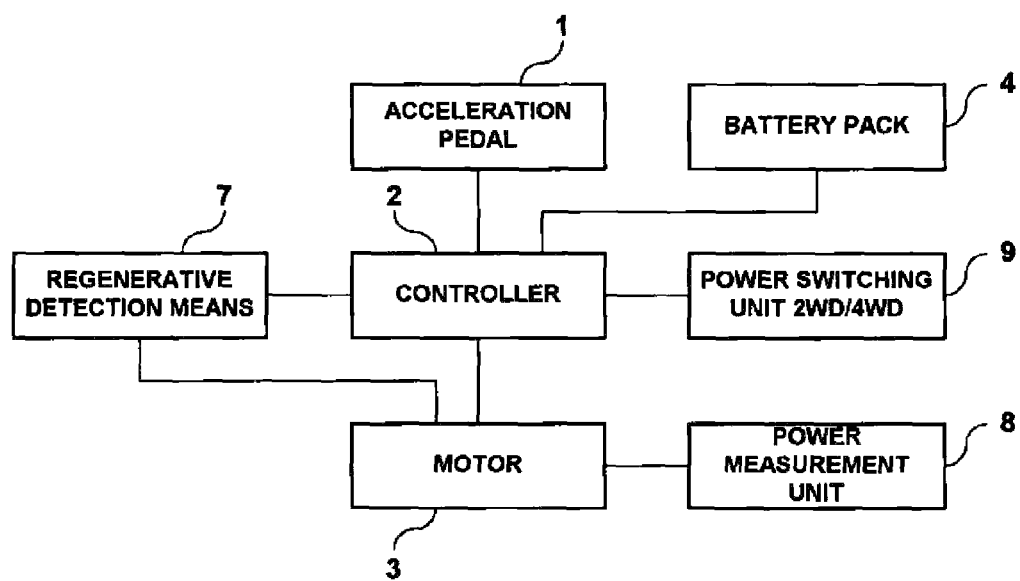
FIG. 3 is a block diagram schematically showing major elements of an electrically driven utility vehicle according to the present invention.

FIG. 1 is a perspective view of an electrically driven utility vehicle having a regenerative braking force distribution control function in accordance with an embodiment of the present invention, FIG. 2 is a schematic plan view schematically showing the general construction of the utility vehicle shown in FIG. 1, and FIG. 3 is a block diagram schematically showing major elements of an electrically driven utility vehicle according to the present invention.

Referring to FIGS. 1 to 3, the electrically driven utility vehicle in accordance with an embodiment of the present invention includes a motor 3 for outputting power for vehicle driving using electric energy provided from a battery pack as a power source and a power switching unit 9 for implementing selective switching to a two-wheel drive mode or a four-wheel drive mode so that power output from the motor 3 is transferred to only one of front wheels FW and rear wheels RW or transferred to both the front wheels FW and the rear wheels RW according to a road surface condition.

A front wheel drive shaft 92b and a rear wheel drive shaft 92a are extended from the power switching unit 9 toward the front and rear of the vehicle, respectively. Accordingly, the power output from the motor 3 and transferred through the drive shafts is transferred to the front wheels FW and the rear wheels RW, each forming a pair of left and right wheels, via a front differential unit 12 and a rear differential unit 14 at the front and rear of the vehicle.

The output of the motor 3 is controlled under the control of a controller 2 according to a manipulation displacement of an acceleration pedal 1. The controller 2 also participates in regenerative control for regenerating kinetic energy into electric energy in addition to the output of the motor 3.

A driver seat space 5 on which a driver and a fellow passenger ride and in which the vehicle can be manipulated is provided between the front wheels FW and the rear wheels RW. Seats 6 for seating are provided in the driver seat space 5. Furthermore, various manipulation units including a steering (reference numeral omitted) for steering are disposed in front of the driver seat space 5, that is, on the dashboard panel side. A space on which a battery pack 4 charged with electric energy can be mounted is formed under the seat 6.

The power switching unit 9 performs an operation for switching to the four-wheel drive mode under the control of the controller 2 at the moment when a foot is taken off from the acceleration pedal 1 in order to break the vehicle while driving and thus regeneration braking is started. A regenerative braking state can be detected through regenerative detection means 7 while driving. In a regenerative braking process, counter electromotive force (induced electromotive force) is generated in the motor 3. Accordingly, a counter electromotive force relay may be adopted as the regenerative detection means 7 so that the regenerative braking state can be detected by detecting the counter electromotive force.

In FIG. 1, reference numeral 10 that is not described is a cargo box for loading goods. In FIG. 3, reference numeral 8 that is not described is a power measurement unit for measuring the amount of regenerative power generated in the regenerative braking state and displaying a measured numerical value as an analog or digital numerical value.

Figure 4:
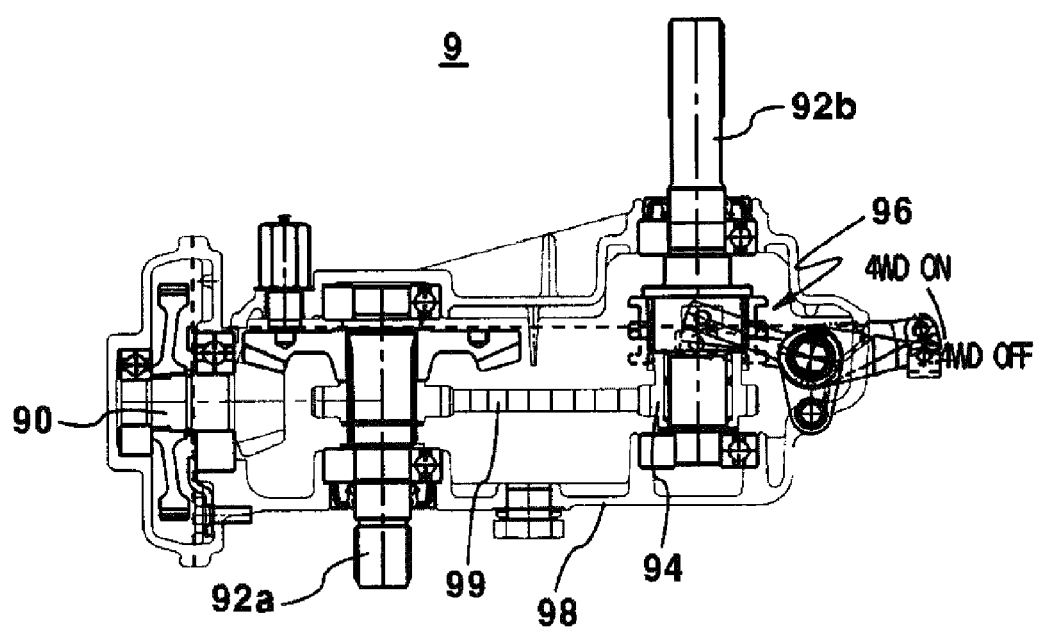
FIG. 4 is an enlarged cross-sectional view showing the construction of a power switching unit shown in FIG. 2 in more detail.

FIG. 4 is an enlarged cross-sectional view showing the construction of the power switching unit shown in FIG. 2 in more detail.

Referring to FIG. 4, the power switching unit 9 includes an input shaft 90 coupled to the output shaft of the motor 3 in such a way as to be driven and a rear wheel drive shaft 92a coupled to the input shaft 90 in such a way as to be driven. A middle shaft 94 is coupled to the rear wheel drive shaft 92a through the medium of a belt 99, etc. in such a way as to be driven and is always rotated. A switching clutch 96 is provided over the middle shaft 94.

The switching clutch 96 may be a sync-mesh type transmission which can be manually manipulated and can automatically implement power connection or blocking by the driving of a switching motor (not shown) that is controlled in response to an instruction from the controller 2 if a regeneration state is detected by the regenerative detection means 7. The front wheel drive shaft 92b is coupled to the middle shaft 94 so that it selectively connects power through the medium of the switching clutch 96.

Reference numeral 98 indicates a casing that provides a closed space for protecting each part.

A process of distributing regenerative braking force which is performed through such an electrically driven utility vehicle is described in brief in association with a method of distributing and controlling regenerative braking force according to another aspect of the present invention.

Figure 5:
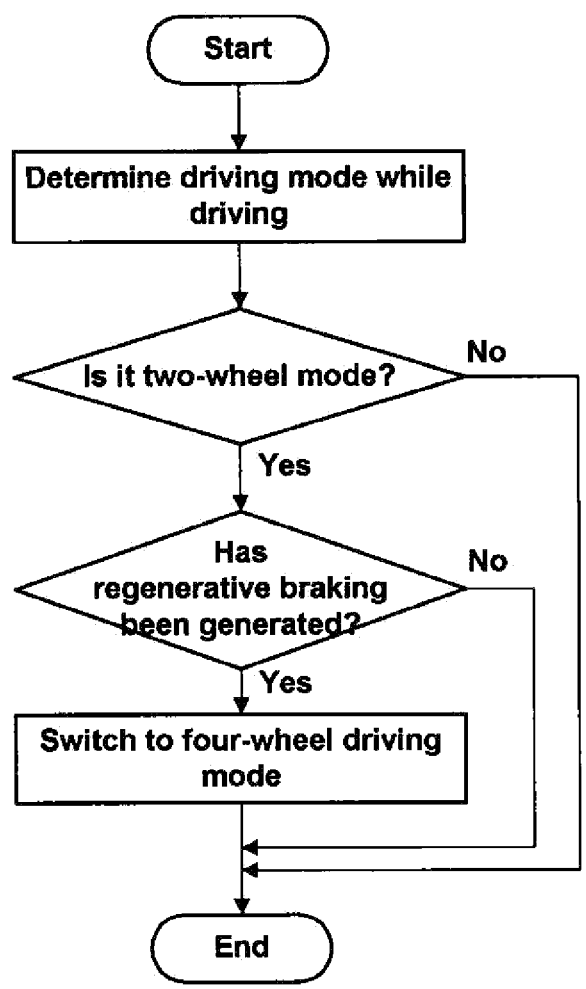
FIG. 5 is control logic for implementing a regenerative braking force distribution control function.

FIG. 5 is control logic for implementing a regenerative braking force distribution control function.

When the acceleration pedal 1 is stepped on, the output of the motor 3 is controlled in proportion to a manipulation displacement and thus driving speed is determined. While the vehicle is driven in the state in which the acceleration pedal 1 has been stepped on, the controller 2 recognizes a current drive mode of the vehicle that is being driven by determining whether the current drive mode is two-wheel or four-wheel.

In such a state, when a foot is taken off from the acceleration pedal 1 for braking, regenerative braking is generated at that moment, and a regeneration state is detected by the regenerative detection means 7. Furthermore, information about the regeneration state is provided to the controller 2.

Thereafter, if the regenerative braking is detected while driving and the current vehicle drive mode recognized by the controller 2 is the two-wheel drive mode, the controller 2 immediately outputs an instruction for the switching of the power switching unit 9.

The power switching unit 9 is driven in response to the switching instruction output by the controller, and thus the drive mode of the two-wheel mode switches to the four-wheel drive mode. When regenerative braking force is generated and at the same time the drive mode switches to the four-wheel drive mode as described above, braking stability can be secured because the regenerative braking force is uniformly transferred to all the wheels.

As described above, in accordance with an embodiment of the present invention, when regenerative braking is generated while driving, switching to the four-wheel drive mode can be performed and thus regenerative braking force thereof can be uniformly distributed and transferred to the front wheels and the rear wheels. Accordingly, a vehicle capable of overcoming a braking force difference between the driving wheels and the follower wheels when regenerative braking is performed even without using a complicated control system for compensating for braking force can be implemented, and there is an advantage in that a production cost can be lowered owing to the exclusion of a complicated control system from an economic viewpoint.

Only a special embodiment has been described in the detailed description of the present invention. It is however to be understood that the present invention is not limited to a special form described in the detailed description, but the present invention should be construed as including all modifications, equivalents, and replacements which fall within the scope and range of the present invention defined by the attached claims.

DESCRIPTION OF REFERENCE NUMERALS

1: acceleration pedal 2: controller
3: motor 4: battery pack
5: driver seat space 6: seat
7: regenerative detection means 8: power measurement unit
9: power switching unit 0: cargo box
12: front differential unit 14: rear differential unit
90: input shaft 92a: rear wheel drive shaft
92b: front wheel drive shaft 94: middle shaft
96: switching clutch 98: casing
FW: front wheel RW: rear wheel

The invention claimed is:

1. An electrically driven utility vehicle having a regenerative braking force distribution control function, wherein the electrically driven utility vehicle is a utility vehicle that moves by driving a motor using, electric energy as a power source and comprises:
  a controller for controlling an output of the motor and regeneration,
  regenerative detection means for detecting a regenerative braking state while driving the motor,
  a power measurement unit for measuring an amount of regenerative power generated in the regenerative braking state, and
  a power switching unit for automatically changing a drive mode from a two-wheel to a four-wheel or from the four-wheel to the two-wheel according to a road surface condition,
  wherein when the regenerative braking state is detected through the regenerative detection means while driving, and a current drive mode is the two-wheel drive mode, the power switching unit operates by the controller and switches to the four-wheel drive mode, and
  wherein the regenerative detection means is a counter electromotive force relay driven by counter electromotive force (induced electromotive force) of the motor that is generated when the regenerative braking is generated.

2. The electrically driven utility vehicle of claim 1, wherein the power switching unit comprises:
  an input shaft coupled to an output shaft of the motor in such a way as to be driven,
  a rear wheel drive shaft coupled to the input shaft in such a way as to be driven,
  a middle shaft coupled to the rear wheel drive shaft in such a way as to be driven and always rotated,
  a switching clutch provided over the middle shaft,
  a front wheel drive shaft coupled to the middle shaft in such a way as to selectively connect power by a medium of the switching clutch, and
  a casing providing a closed space by which each of the parts can be protected.

3. The electrically driven utility vehicle of claim 2, wherein the switching clutch is a sync-mesh type transmission structure which is able to be manually manipulated through a lever and to automatically connect or block power by a switching motor according to control of the controller.

4. A regenerative braking force distribution and control method of an electrically driven utility vehicle, comprising steps of:
  (a) determining a current drive mode while driving;
  (b) detecting regenerative braking while driving; and
  (c) switching the vehicle from the current drive mode to a four-wheel drive mode through control of a power switching unit through a controller if the regenerative braking is detected while driving and the current drive mode is a two-wheel drive mode.

5. The regenerative braking force distribution and control method of claim 4, wherein in the step of detecting the regenerative brake, the regenerative braking is detected using counter electromotive force (induced electromotive force) of a motor generated when the regenerative braking is performed.

* * * * *